US010762730B2

(12) United States Patent
Brillon et al.

(10) Patent No.: US 10,762,730 B2
(45) Date of Patent: Sep. 1, 2020

(54) METHOD FOR SECURE ACCESS TO A MOTOR VEHICLE

(71) Applicants: Continental Automotive France, Toulouse (FR); Continental Automotive GmbH, Hannover (DE)

(72) Inventors: Alain Brillon, Villeneuve Tolosane (FR); Alex Fournié, Ste Foy de Peyrolières (FR); Isabelle Bacaer, Cornebarrieu (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/481,549

(22) PCT Filed: Mar. 14, 2018

(86) PCT No.: PCT/FR2018/050600
§ 371 (c)(1),
(2) Date: Jul. 29, 2019

(87) PCT Pub. No.: WO2018/172663
PCT Pub. Date: Sep. 27, 2018

(65) Prior Publication Data
US 2020/0193750 A1 Jun. 18, 2020

(30) Foreign Application Priority Data
Mar. 20, 2017 (FR) ...................... 17 52251

(51) Int. Cl.
*G07C 9/00* (2020.01)
*G07C 9/22* (2020.01)
(Continued)

(52) U.S. Cl.
CPC ...... *G07C 9/00309* (2013.01); *B60R 25/2018* (2013.01); *B60R 25/245* (2013.01);
(Continued)

(58) Field of Classification Search
CPC .. G07C 9/00309; G07C 9/22; G07C 9/00182; B60R 25/2018; B60R 25/245
See application file for complete search history.

(56) References Cited

U.S. PATENT DOCUMENTS

| 5,838,257 A | 11/1998 | Lambropoulos |
| 10,315,623 B2* | 6/2019 | Iwashita ............... B60R 25/245 |
| 2014/0368313 A1* | 12/2014 | Seiberts ............ G07C 9/00309 340/5.61 |

FOREIGN PATENT DOCUMENTS

| DE | 102011013605 A1 | 9/2012 |
| DE | 102011050160 A1 | 11/2012 |

(Continued)

OTHER PUBLICATIONS

English Translation of the Written Opinion for International Application No. PCT/FR2018/050600, dated Jun. 8, 2018, 8 pages.
(Continued)

*Primary Examiner* — Nabil H Syed
(74) *Attorney, Agent, or Firm* — RatnerPrestia

(57) ABSTRACT

A method for securely accessing a motor vehicle whose opening elements are locked and unlocked through wireless communication between a portable access device and an access control module on board the vehicle. The method includes authenticating the device with the access control module, unlocking the vehicle when the device has been authenticated, periodically transmitting, by way of the access control module, an interrogation signal into at least part of the passenger compartment of the vehicle intended for the device following unlocking of the vehicle, upon each reception by the device of said interrogation signal, trigger-
(Continued)

ing a first timeout the duration of which is greater than the transmission period of the interrogation signal, and deactivating the device when the first timeout has expired and the immobile state of the device is detected.

9 Claims, 2 Drawing Sheets

(51) Int. Cl.
*B60R 25/20* (2013.01)
*B60R 25/24* (2013.01)
(52) U.S. Cl.
CPC ............ *G07C 9/00182* (2013.01); *G07C 9/22* (2020.01); *G07C 2009/00269* (2013.01); *G07C 2009/00293* (2013.01); *G07C 2009/00555* (2013.01); *G07C 2009/00769* (2013.01); *G07C 2009/00841* (2013.01)

(56) References Cited

FOREIGN PATENT DOCUMENTS

| DE | 202015005832 U1 | 9/2015 |
| DE | 202016003349 U1 | 6/2016 |
| DE | 102016003129 A1 | 9/2017 |
| EP | 0808971 A2 | 11/1997 |
| EP | 0984124 A2 | 3/2000 |
| EP | 1447775 A2 | 8/2004 |
| WO | 2012119681 A1 | 9/2012 |

OTHER PUBLICATIONS

International Search Report and Written Opinion for International Application No. PCT/FR2018/050600, dated Jun. 8, 2018—9 pages.

\* cited by examiner

METHOD FOR SECURE ACCESS TO A MOTOR VEHICLE

CROSS REFERENCE TO RELATED APPLICATIONS

This application is the U.S. National Phase application of PCT International Application No. PCT/FR2018/050600, filed Mar. 14, 2018, which claims priority to French Patent Application No. 1752251, filed Mar. 20, 2017, the contents of such applications being incorporated by reference herein.

FIELD OF THE INVENTION

The present invention pertains to the field of motor vehicle security, and relates more precisely to a method and a device for secure hands-free access to a motor vehicle. The invention aims in particular to make it possible to unlock and lock the vehicle so as to prevent relay attacks.

BACKGROUND OF THE INVENTION

Nowadays, many motor vehicles are equipped with a hands-free access and starting system. Such a system includes an access device, for example a key, a fob or a mobile telephone, carried by the user of the vehicle, and a starting and access control module on board the vehicle that is configured so as to communicate on a wireless communication link with said access device so as to authenticate it and authorize unlocking and locking of the opening elements of the vehicle and starting of the engine.

As is known, the control module periodically transmits a broadcast signal via an antenna. When the user carrying the access device approaches the vehicle in order to unlock it, the broadcast signal is captured via its antenna by the access device, which responds to the control module by sending it an authentication message comprising its identifier. When the identifier is valid and the user carrying the access device comes into contact with a predetermined zone of the vehicle, for example when he places his hand on the handle of the driver's door, which is equipped with an approach detection sensor, the control module unlocks the opening elements of the vehicle and authorizes starting of the engine.

Such a wireless communication system may be subject to attacks allowing an unauthorized person to enter into the passenger compartment or even to start the engine of the vehicle. One type of known attack, called relay attack, allows a thief to unlock the opening elements of the vehicle while remaining at a distance therefrom, for example of more than 10 meters. More precisely, the thief triggers sending, by the access device, of an authentication message that it relays to the control module so as to unlock the vehicle and then start the engine. This relay may be performed on a UHF (ultra-high-frequency) communication link, which is operational up to for example 100 meters.

A first type of relay attack may be performed using an attack device comprising two radio antennas connected to one another via a coaxial cable. When one of the antennas is presented close to the door of the vehicle, it captures the broadcast signal transmitted by the antenna of the control module. This magnetic field excites the first antenna of the attack device, which creates, through induction, an electrical signal that propagates in the coaxial cable. When this signal is received by the second antenna of the attack device, the latter generates an omnidirectional magnetic field. This radio field then excites the antenna of the access device, which demodulates the signal and sends the vehicle an authentication message allowing opening of the opening elements and starting of the engine.

A second type of relay attack may be performed with a wireless attack device comprising two radio antennas, a transmitter and a receiver. The transmitter captures the broadcast signal transmitted by the antenna of the control module so as to convert it into radio waves, for example at 2.5 GHz, and then amplifies it in order to transmit it to the receiver. The receiver receives this signal, converts it and sends it to the antenna of the access device. The access device responds to this signal with an authentication message that the attack device transmits to the control module, which then unlocks the opening elements and authorizes starting of the engine.

One known solution for combating such relay attacks involves equipping the access device with a motion sensor that makes it possible, in the event of a prolonged absence of motion, for example after a few minutes, to deactivate said access device, the latter not being a priori about to be used. Thus, when it is deactivated, the access device is not able to respond to a relay attack. The access device is then reactivated when motion is detected, for example when a user picks it up.

The access device may however be immobile even though it is necessary to be able to start the engine. This may be the case for example when a user leaves the access device in the vehicle and does not start the engine for a few minutes, for example when he is on the telephone. In this case, the access device deactivates in the absence of motion, then preventing the user from starting the engine unless the access device is moved again, which constitutes a major drawback.

SUMMARY OF THE INVENTION

An aim of an aspect of the present invention is to rectify these drawbacks by proposing a simple and effective solution allowing an authorized user to use the device for accessing the vehicle to unlock said vehicle and start the engine later on without needing to manipulate the access device again, while at the same time preventing relay attacks from the vicinity of the vehicle.

To this end, an aspect of the invention relates first of all to a method for securely accessing a motor vehicle whose opening elements are locked and unlocked through wireless communication between a portable access device and an access control module on board said vehicle, said device comprising a motion sensor.

The method is noteworthy in that it comprises the steps of authenticating the device with the access control module, of unlocking the vehicle when the device has been authenticated, of periodically transmitting, by way of the access control module, an interrogation signal into at least part of the passenger compartment of the vehicle intended for the device following unlocking of the vehicle, upon each reception by the device of said interrogation signal, of triggering a first timeout the duration of which is greater than the transmission period of the interrogation signal, and of deactivating the device when the first timeout has expired and the immobile state of said device is detected by the motion sensor.

The term "unlocking the vehicle" is understood to mean the unlocking of at least one opening element of the vehicle, for example of at least one door, of the passenger compartment, of the trunk, etc. The term "deactivating the device" is understood to mean that the device is unable to unlock the vehicle (or even to start the engine thereof).

An aspect of the invention makes it possible to avoid the access device deactivating at the time when it is liable to be used in the vehicle. More precisely, an aspect of the invention makes it possible to prevent the access device from being deactivated as soon as the vehicle has been unlocked, even if the device remains immobile for a duration greater than the duration necessary to deactivate it when it is distant from the vehicle, for example in the user's home. Specifically, as unlocking of the vehicle by the device is synonymous with use of said device and therefore of the vehicle, the method according to an aspect of the invention makes it possible to keep the device active in the vehicle and to make it inactive as soon as the user carrying the device moves away from the vehicle and leaves the device.

According to one aspect of the invention, the step of authenticating the device with the access control module comprises, the device being associated with an identifier, a sub-step of receiving a broadcast signal transmitted by the access control module, a sub-step of sending, by the device, an unlock request to the access control module, said request comprising the identifier of the device, the authentication of the device then being performed by the access control module on the basis of the identifier contained in the received unlock request.

In this case, the deactivation of the device may be performed by the device by preventing sending of an unlock request, for example by severing the supply of electric power to its antenna or by sending, in response to the reception of a broadcast signal and instead of an unlock request, a message in which it indicates that its state is deactivated.

According to one advantageous aspect of the invention, the duration of the first timeout is greater than or equal to three times the period of the interrogation signal.

Advantageously, the duration of the period of the interrogation signal is between 1 and 5 minutes.

Again advantageously, the duration of the first timeout is between 3 and 15 minutes. A margin, for example of 5%, may be provided so as to compensate the inaccuracy of the clocks of the electronic components used in the device, where applicable.

Preferably, the immobile state of the device is detected when the motion sensor does not detect any motion for the duration of a second timeout.

In a first embodiment, the second timeout is triggered upon each motion of the device detected by the motion sensor, the duration of the second timeout then being greater than the duration of the first timeout.

In a second embodiment, the second timeout is triggered only when the first timeout has expired.

Preferably, the duration of the second timeout is greater than the duration of the first timeout. The duration of the second timeout may for example be between 3 and 20 minutes.

In one embodiment, the method comprises a step of locking the vehicle by way of the device and a step of stopping the periodic transmission, by the access control module, of the interrogation signal following said locking of the vehicle, so as to allow the first timeout to expire.

An aspect of the invention also relates to a portable device for accessing a motor vehicle whose opening elements are locked and unlocked through wireless communication between said device and an access control module on board said vehicle, said device comprising a motion sensor and being able to authenticate itself with the access control module.

The device is noteworthy in that it is configured so as to receive an interrogation signal transmitted periodically by the access control module into at least part of the passenger compartment of the vehicle intended for the device following unlocking of the vehicle, so as, upon each reception by the device of said interrogation signal, to trigger a first timeout the duration of which is greater than the transmission period of the interrogation signal, so as to deactivate the device when the first timeout has expired and the immobile state of said device is detected on the basis of the motion sensor.

According to one advantageous aspect of the invention, the duration of the first timeout is greater than or equal to three times the period of the interrogation signal.

Advantageously, the duration of the period of the interrogation signal is between 1 and 5 minutes.

Again advantageously, the duration of the first timeout is between 3 and 15 minutes. A margin, for example of 5%, may be provided so as to compensate the inaccuracy of the clocks of the electronic components used in the device, where applicable.

Preferably, the device is configured so as to detect an immobile state when the motion sensor does not detect any motion for the duration of a second timeout.

In a first embodiment, the second timeout is triggered upon each motion of the device detected by the motion sensor, the duration of the second timeout then being greater than the duration of the first timeout.

In a second embodiment, the second timeout is triggered only when the first timeout has expired.

Preferably, the duration of the second timeout is greater than the duration of the first timeout. The duration of the second timeout may for example be between 3 and 20 minutes.

An aspect of the invention also relates to a motor vehicle whose opening elements are able to be locked and unlocked through wireless communication between a device and an access control module on board said vehicle, said access control module being configured so as to authenticate said device, so as to unlock the vehicle when the device has been authenticated, and so as to periodically transmit an interrogation signal into at least part of the passenger compartment of the vehicle intended for the device following unlocking of the vehicle.

An aspect of the invention relates lastly to a system for the secure unlocking and locking of a motor vehicle, said system comprising at least a device and a vehicle as presented above.

BRIEF DESCRIPTION OF THE DRAWINGS

Other features and advantages of aspects of the invention will become apparent from the following description, given with reference to the appended figures that are given by way of non-limiting example and in which identical references are given to similar objects.

DETAILED DESCRIPTION OF THE PREFERRED EMBODIMENTS

The system according to an aspect of the invention makes it possible to secure access to a motor vehicle, in particular for the purpose of reducing or even eliminating the risk of a relay attack.

Figure 1:
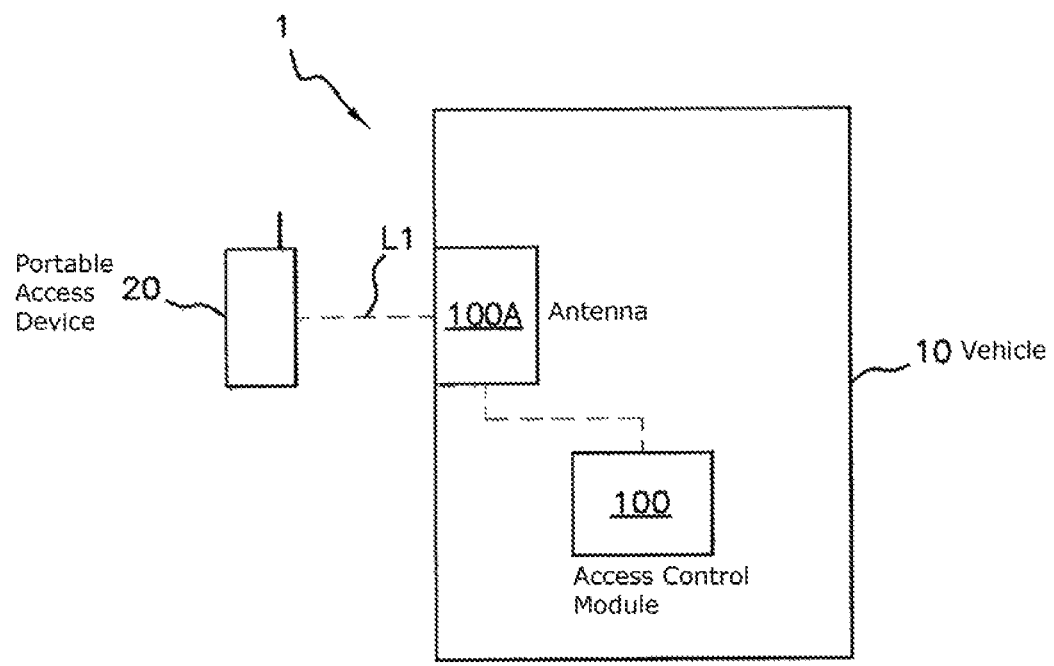
FIG. 1 schematically illustrates one embodiment of the system according to an aspect of the invention.

In the example illustrated in FIG. 1, the system 1 according to an aspect of the invention comprises a motor vehicle 10 and an access device 20 for locking and unlocking said vehicle 10 and, preferably, starting the engine (not shown) of the vehicle 10. The terms "locking/unlocking the vehicle" are understood to mean locking/unlocking at least one opening element of the vehicle, for example a door, the trunk, etc. It will be noted that the system could comprise more than one device, without this limiting the scope of an aspect of the present invention.

The vehicle 10 comprises an access control module 100, which may for example take the form of a computer known under the name ECU (electronic control unit), connected to an antenna 100A (or a plurality of antennas), for example installed in a door handle of the vehicle so as to communicate with the device 20.

This access control module 100 is configured so as to periodically transmit a broadcast signal into a coverage zone (not shown) around the vehicle 10 and so as to receive an unlock request comprising an identifier of the device 20 so as to authenticate it and then to authorize unlocking of the vehicle 10, as will be described below.

The access control module 100 is configured so as to communicate with the device 20 on a wireless communication link L1, in particular in order to unlock the vehicle 10. Such a communication link L1 may be an LF (low-frequency) communication link, for example in the frequency band ranging from a few ten to a few hundred kHz, or else UHF (ultra-high-frequency) in the 30 MHz-3 GHz band, again for example in the 2-2.4 GHz frequency band (Bluetooth®).

The access control module 100 is also configured, once the vehicle 10 has been unlocked and until it is locked again, so as to periodically transmit an interrogation signal to the device 20. Preferably, this interrogation signal is transmitted on the existing communication link L1 between the device 20 and the access control module 100, but it will be noted that it could be transmitted on any other suitable communication link. The interrogation signal may be transmitted into all or part of the passenger compartment, or even also both into and outside of the passenger compartment of the vehicle 10. Preferably, the duration of the period of the interrogation signal is between 1 and 5 minutes.

Figure 2:
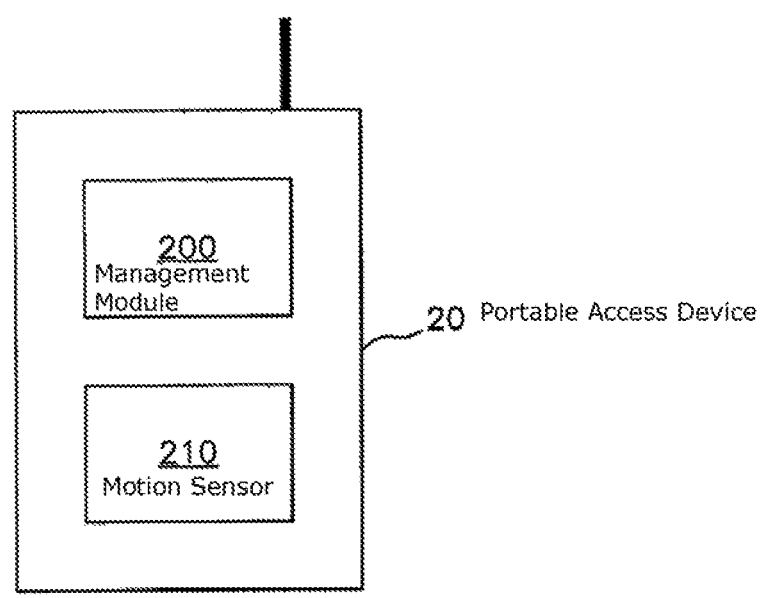
FIG. 2 schematically illustrates one embodiment of the device according to an aspect of the invention.

The device 20 is intended to be borne by a user so as to allow him to control locking and unlocking of the vehicle 10. With reference to FIG. 2, the device 20 comprises a management module 200 and a motion sensor 210.

The motion sensor 210 is able to detect motion of the device 20 and to transmit a detection signal when motion of the device has been detected.

The management module 200 is configured so as to communicate on the wireless communication link L1 with the antenna 100A of the access control module 100, in particular in order to unlock the vehicle 10.

Thus, when the device 20 enters into the coverage zone of the vehicle 10 into which the access control module 100 periodically transmits a broadcast signal, the device 20 is able to receive this broadcast signal and to respond to the access control module 100 by sending an unlock request comprising the identifier of the device 20, which makes it possible to authenticate and to authorize unlocking of the vehicle 10 by the access control module 100.

It will be noted that other data may be exchanged on the wireless communication link L1 between the device 20 and the access control module 100, without this limiting the scope of an aspect of the present invention.

The management module 200 is also configured so as to receive the interrogation signal transmitted periodically by the access control module 100, and so as, upon each reception of said interrogation signal, to trigger a first timeout the duration of which is greater than the transmission period of the interrogation signal. Preferably, the duration of the first timeout is between 3 and 15 minutes. A margin, for example of 5%, may be provided so as to compensate the inaccuracy of the clocks of the electronic components used in the device 20, where applicable.

The management module 200 is also configured so as to detect an immobile state of the device 20 when the motion sensor 210 does not detect any motion for the duration of a second timeout.

In a first embodiment, the second timeout is triggered upon each motion of the device 20 detected by the motion sensor 210, the duration of the second timeout then being greater than the duration of the first timeout.

In a second embodiment, the second timeout is triggered only when the first timeout has expired.

Preferably, the duration of the second timeout is greater than the duration of the first timeout. The duration of the second timeout may for example be between 3 and 20 minutes.

The term "timeout" is understood to mean a time interval of a predetermined duration. In practice, such a timeout may for example be implemented by using a computerized timer. As the management of such a timeout is known per se, it will not be described in more detail here.

The management module 200 is also configured so as to deactivate the device and in particular the function of unlocking the vehicle when the first timeout has elapsed and an immobile state of the device is detected.

The terms "deactivate the device" and "deactivating the device" are understood to mean that the device switches into an "inactive" mode in which it is unable to send an unlock request, for example by interrupting the supply of electric power to its antenna or by sending a deactivated state message instead of sending an unlock request following the reception of a broadcast signal.

In one preferred embodiment, for as long as it is in the coverage zone of the access control module 100, the device 20 periodically receives the broadcast signal transmitted by the access control module 100, to which it responds in order to inform it of its presence. When the device 20 exits the coverage zone of the broadcast signal, the access control module 100 no longer receives a presence message from the device 20, and then locks the vehicle 10.

Figure 3:
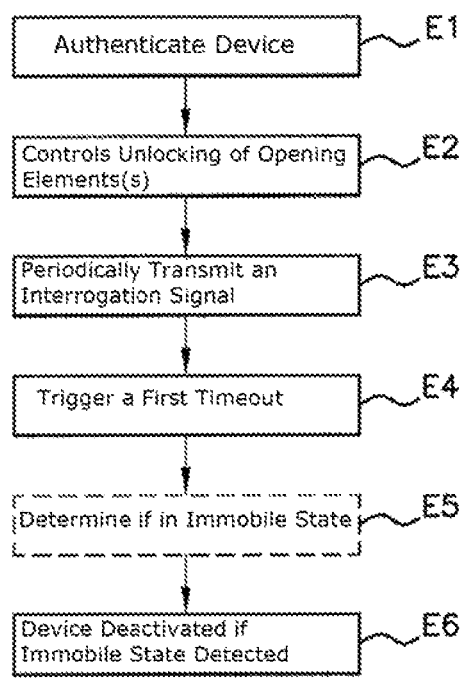
FIG. 3 schematically illustrates one embodiment of the method according to an aspect of the invention.

An aspect of the invention will now be described in terms of the implementation thereof with reference to FIGS. 1 to 3.

First of all, with the vehicle 10 being locked, the access control module 100 periodically transmits a broadcast signal into a coverage zone extending around the vehicle 10, for example within a radius of 10 meters.

When a user carrying the device 20 enters into the coverage zone and receives the broadcast signal, the device 20 sends an unlock request comprising its identifier to the access control module 100.

Once the access control module 100 has received the unlock request, it authenticates the device 20 in a step E1. To this end, it verifies that the identifier of the device 20 is valid, that is to say corresponds to a device 20 authorized to unlock the opening elements of the vehicle 10, and then it controls the unlocking of said opening elements, for example the doors or the trunk, in a step E2.

Once the opening elements of the vehicle 10 have been unlocked, the access control module 100 starts to periodically transmit an interrogation signal in a step E3.

Upon each reception of an interrogation signal, the management module 200 of the device 20 triggers, in a step E4, a first timeout the duration of which is greater than the transmission period of the interrogation signal by the access control module 100. In other words, the first timeout is reset each time the periodic interrogation signal is received. Thus, for as long as the device 20 is within transmission range of the access control module 100 and as long as it receives the interrogation signal, the first timeout will be effective.

In parallel, an immobile state of the device 20 is determined by the management module 200 when the motion sensor 210 does not detect any motion for the duration of a second timeout (step E5).

In a first embodiment, the second timeout is triggered upon each motion detected by the motion sensor 210, the duration of the second timeout then being greater than the duration of the first timeout. In this case, the second timeout is thus reset for as long as the device 20 is in motion.

In a second embodiment, the second timeout is triggered only when the first timeout has expired.

The device 20 remains active for as long as the first timeout is effective, that is to say for as long as the interrogation signal transmitted by the access control module 100 is received by the device 20.

The first timeout expires when the device 20 no longer receives the interrogation signal. This may be the case when the device 20 is no longer in the reception zone of the interrogation signal (for example because the device 20 has been moved away from the vehicle 10 by a user) or when the access control module 100 stops periodically transmitting the interrogation signal, for example when the passenger compartment of the vehicle 10 is locked by the device 20.

Once the first timeout has expired, the device deactivates in a step E6 when an immobile state of the device 20 is detected, then preventing any relay attack.

When this immobile state is detected using a second timeout, the device 20 deactivates when the second timeout expires, that is to say when the motion sensor 210 has not detected any motion for the duration of said second timeout.

The invention claimed is:

1. A method for securely accessing a motor vehicle whose opening elements are locked and unlocked through wireless communication between a portable access device and an access control module on board said motor vehicle, said portable access device comprising a motion sensor, the method comprising:
   authenticating the portable access device with the access control module,
   unlocking the motor vehicle when the portable access device has been authenticated,
   periodically transmitting, by way of the access control module, an interrogation signal into at least part of the passenger compartment of the motor vehicle intended for the portable access device following unlocking of the motor vehicle,
   upon each reception by the portable access device of said interrogation signal, triggering a first timeout a duration of which is greater than a transmission period of the interrogation signal,
   deactivating the portable access device when the first timeout has expired and an immobile state of said portable access device is detected by the motion sensor, wherein the immobile state of the portable access device is detected when the motion sensor does not detect any motion for a duration of a second timeout.

2. The method as claimed in claim 1, wherein the second timeout is triggered upon each motion of the portable access device detected by the motion sensor, the duration of the second timeout then being greater than the duration of the first timeout.

3. The method as claimed in claim 1, wherein the second timeout is triggered only when the first timeout has expired.

4. The method as claimed in claim 1, wherein the duration of the period of the interrogation signal is between 1 and 5 minutes.

5. The method as claimed in claim 1, wherein the duration of the first timeout is between 3 and 15 minutes.

6. A portable device for accessing a motor vehicle whose opening elements are locked and unlocked through wireless communication between said portable device and an access control module on board said motor vehicle, said portable device comprising a motion sensor and being able to authenticate itself with the access control module, the portable device being configured so as to:
   receive an interrogation signal transmitted periodically by the access control module into at least part of the passenger compartment of the motor vehicle intended for the portable device following unlocking of the motor vehicle,
   upon each reception by the portable device of said interrogation signal, trigger a first timeout a duration of which is greater than a transmission period of the interrogation signal,
   deactivate the portable device when the first timeout has expired and an immobile state of said portable device is detected on the basis of the motion sensor, the portable device being configured so as to detect the immobile state when the motion sensor does not detect any motion for a duration of a second timeout.

7. The portable device as claimed in claim 6, wherein the duration of the first timeout is greater than or equal to three times the period of the interrogation signal.

8. A system for the secure unlocking and locking of a motor vehicle, said system comprising:
   at least one portable device as claimed in claim 6, and
   a motor vehicle whose opening elements are able to be locked and unlocked through wireless communication between said portable device and an access control module on board said motor vehicle, said access control module being configured to authenticate the portable device, to unlock the vehicle when the portable device has been authenticated, and to periodically transmit an interrogation signal into at least part of the passenger compartment of the motor vehicle intended for the portable device following unlocking of the motor vehicle.

9. A system for the secure unlocking and locking of a motor vehicle, said system comprising:
- at least one portable device as claimed in claim 7, and
- a motor vehicle whose opening elements are able to be locked and unlocked through wireless communication between said portable device and an access control module on board said motor vehicle, said access control module being configured:
- to authenticate the portable device,
- unlock the motor vehicle when the portable device has been authenticated, and
- to periodically transmit an interrogation signal into at least part of the passenger compartment of the motor vehicle intended for the portable device following unlocking of the motor vehicle.

* * * * *